US008244658B2

(12) United States Patent
Weissman et al.

(10) Patent No.: US 8,244,658 B2
(45) Date of Patent: Aug. 14, 2012

(54) SYSTEM, METHOD AND COMPUTER PROGRAM PRODUCT FOR GENERATING A SET OF INSTRUCTIONS TO AN ON-DEMAND DATABASE SERVICE

(75) Inventors: Craig Weissman, San Francisco, CA (US); Andrew Waite, Novato, CA (US)

(73) Assignee: salesforce.com, inc., San Francisco, CA (US)

( * ) Notice: Subject to any disclaimer, the term of this patent is extended or adjusted under 35 U.S.C. 154(b) by 272 days.

(21) Appl. No.: 12/434,490

(22) Filed: May 1, 2009

(65) Prior Publication Data

US 2009/0276405 A1 Nov. 5, 2009

(51) Int. Cl.
*G06F 17/00* (2006.01)
(52) U.S. Cl. ......................................................... 706/45
(58) Field of Classification Search .................. 707/103, 707/999.103; 706/17.005, E17.005, E17.108, 706/E17.055
See application file for complete search history.

(56) References Cited

U.S. PATENT DOCUMENTS

| | | | | |
|---|---|---|---|---|
| 6,092,197 | A * | 7/2000 | Coueignoux | 726/21 |
| 7,209,929 | B2 | 4/2007 | Dominguez, Jr. et al. | 707/103 |
| 2003/0233404 | A1 | 12/2003 | Hopkins | 709/203 |
| 2005/0065925 | A1 | 3/2005 | Weissman et al. | 707/4 |
| 2005/0216670 | A1 | 9/2005 | Atkinson et al. | 711/118 |
| 2005/0223022 | A1 | 10/2005 | Weissman et al. | 707/102 |
| 2005/0246415 | A1* | 11/2005 | Belfiore et al. | 709/203 |
| 2005/0283478 | A1 | 12/2005 | Choi et al. | 707/9 |
| 2006/0206834 | A1 | 9/2006 | Fisher et al. | 715/777 |
| 2007/0088741 | A1 | 4/2007 | Brooks et al. | 707/103 |
| 2008/0059416 | A1 | 3/2008 | Forbes et al. | |
| 2008/0086482 | A1 | 4/2008 | Weissman | 707/10 |
| 2008/0263078 | A1* | 10/2008 | Perry et al. | 707/102 |

OTHER PUBLICATIONS

The Datacycle Architecture T.F. Bowen, G. Gopal, G. Herman, T. Hickey, K.C. Lee, W.H. Mansfield, J. Raitz, and A. Weinrib Connunicationj Oili VHI acN/Dec. 1992/vol. 35, No. 12.*
International Preliminary Report on Patentability from International Application No. PCT/US2009/002701, dated Nov. 2, 2010.
U.S. Appl. No. 60/828,192, filed Oct. 4, 2006.
U.S. Appl. No. 10/817,161, filed Apr. 2, 2004.
International Search Report and Written Opinion from PCT Application No. PCT/US09/02701 mailed on Jul. 2, 2009.

* cited by examiner

*Primary Examiner* — Omar Fernandez Rivas
*Assistant Examiner* — Ababacar Seck
(74) *Attorney, Agent, or Firm* — Zilka-Kotab, PC (57) ABSTRACT

In accordance with embodiments, there are provided mechanisms and methods for generating a set of instructions to an on-demand database service. These mechanisms and methods for generating a set of instructions to an on-demand database service can enable embodiments to generate instructions capable of operating on objects, without having any knowledge of the objects on which the instructions are going to operate, until runtime. The ability of embodiments to provide this instruction generation may allow generic instructions to be generated, independent of the objects on which they will operate.

18 Claims, 4 Drawing Sheets

SYSTEM, METHOD AND COMPUTER PROGRAM PRODUCT FOR GENERATING A SET OF INSTRUCTIONS TO AN ON-DEMAND DATABASE SERVICE

CLAIM OF PRIORITY

This application claims priority to U.S. Provisional Patent Application No. 61/049,693 entitled "Method And System For Runtime Variable Shape Discovery In A Strongly Typed Computing Language For On-Demand Services," by Craig Weissman et al., filed Mar. 1, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to generating instructions for such database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to allow users of such database systems the flexibility of developing scripts to run in the context of the database system. To date, however, the users must have detailed knowledge of the scripting language and of the objects on which the scripts are to operate.

BRIEF SUMMARY

In accordance with embodiments, there are provided mechanisms and methods for generating a set of instructions to an on-demand database service. These mechanisms and methods for generating a set of instructions to an on-demand database service can enable embodiments to generate instructions capable of operating on objects, without having any knowledge of the objects on which the instructions are going to operate, until runtime. The ability of embodiments to provide this instruction generation may allow generic instructions to be generated, independent of the objects on which they will operate.

In an embodiment and by way of example, a method is provided for generating a set of instructions to an on-demand database service. In use, at least one programming language instruction associated with at least one custom object is received at a platform supporting applications built by third parties. Additionally, a shape is determined for the at least one custom object based upon a runtime instance of the at least one custom object. Furthermore, a set of instructions to an on-demand database service is generated, based on the at least one programming language instruction, the set of instructions configured to operate upon the runtime instance of the at least one custom object based upon the shape.

While the present invention is described with reference to an embodiment in which techniques for generating a set of instructions to an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for generating a set of instructions to an on-demand database service.

Currently, users must have detailed knowledge of a scripting language and of the objects on which the scripts are to operate in order to develop scripts capable of running in the context of an on-demand database system.

Thus, mechanisms and methods are provided herein for generating a set of instructions to an on-demand database service. These mechanisms and methods for generating a set of instructions to an on-demand database service can enable embodiments to generate instructions capable of operating on objects, without having any knowledge of the objects on which the instructions are going to operate, until runtime. The ability of embodiments to provide this instruction generation may allow generic instructions to be generated, independent of the objects on which they will operate.

Next, mechanisms and methods for generating a set of instructions to an on-demand database service will be described with reference to exemplary embodiments.

Figure 1:
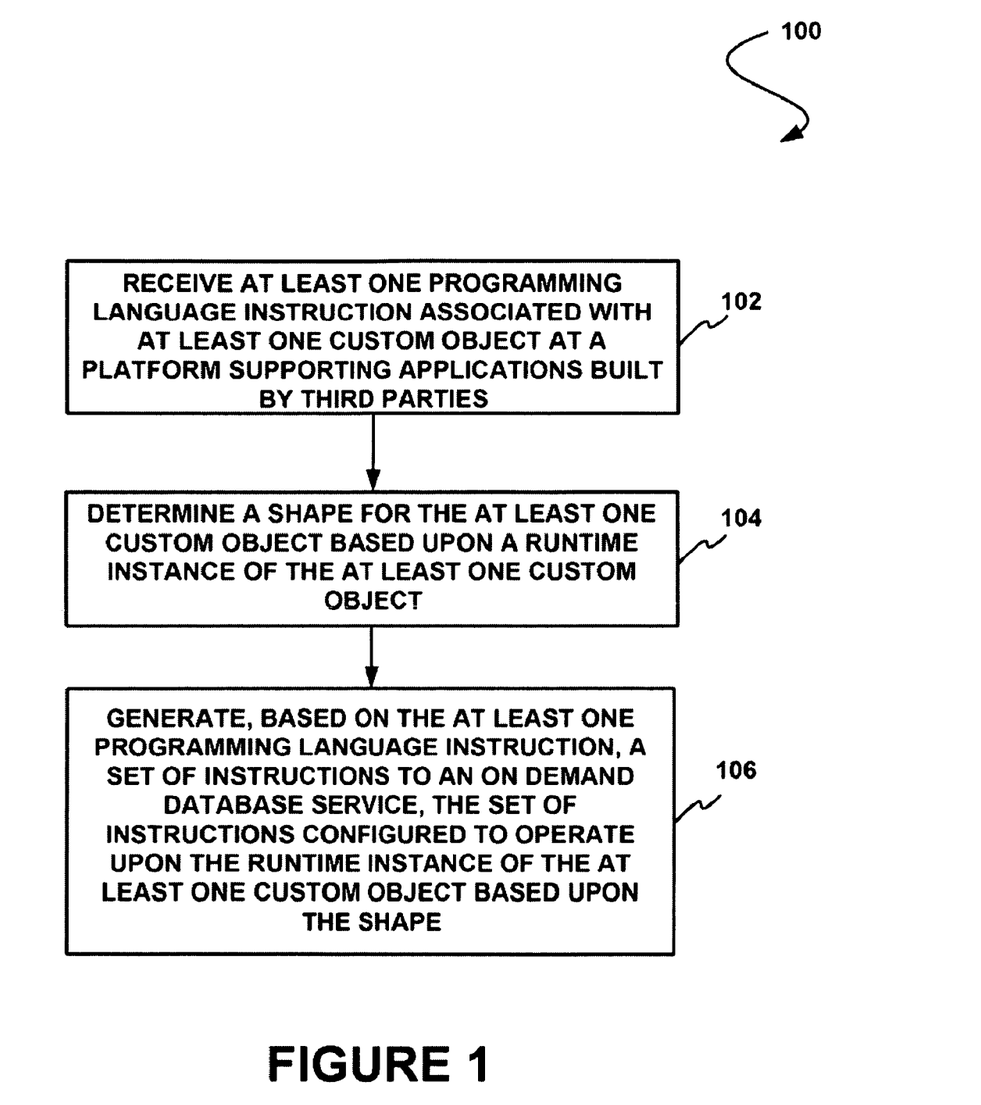
FIG. 1 shows a method for generating a set of instructions to an on-demand database service, in accordance with one embodiment.

FIG. 1 shows a method 100 for generating a set of instructions to an on-demand database service, in accordance with one embodiment. As shown, at least one programming language instruction associated with at least one custom object is received at a platform supporting applications built by third parties. See operation 102.

In the context of the present description, a programming language instruction refers to any instruction or command written in a programming language. Furthermore, a custom object refers to any object capable of being customized. In various embodiments, the custom object may include a table, a portion of a table, a plurality of tables, and/or various other objects.

Still yet, the platform supporting applications built by third parties may include any platform. For example, in various embodiments, the platform may include a platform associated with an on-demand database service, a customer server, an organization server, a user system, and/or any other platform capable of supporting applications built by third parties. In this case, the third party may include any user and/or organization capable of building applications. In one embodiment, the third party may include one or more users of an on-demand database service.

An on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Once the programming language instruction is received, a shape for the at least one custom object is determined based upon a runtime instance of the at least one custom object. See operation 104. In one embodiment, the shape may be indicated by a number of columns and/or rows associated with the custom object.

Furthermore, a set of instructions to an on-demand database service is generated based on the at least one programming language instruction. See operation 106. In this case, the set of instructions is configured to operate upon the runtime instance of the at least one custom object based upon the shape.

In addition to generating the instructions, in one embodiment, the set of instructions may be applied to the on-demand database service. In this case, applying the set of instructions to the on-demand database service may affect a result in accordance with the programming language instruction.

Additionally, in one embodiment, a user of the on-demand database service may be presented with a list of entity types. As an option, the list may further include a plurality of fields. From this list, a selection of one or more of the plurality of fields or the entity types may be received.

In this case, the set of instructions may be generated based on the selection. The instructions may include any instruction. For example, in one embodiment, the instructions may include a query (e.g. a search query, etc.). In either case, the set of instructions may be executed. As an option, results of the execution of the set of instructions may be displayed.

It should be noted that, in various embodiments, the shape of the custom object may be determined using different techniques. For example, in one embodiment, the shape may be determined utilizing one or more tokens. In the context of the present description, a token refers to any item (e.g. code, an identifier, etc.) capable of including information associated with a custom object. As an option, the token may include metadata (e.g. metadata associated with the custom object, etc.).

In one embodiment, the custom objects may be capable of accessing the tokens. In various embodiments, the tokens may represent at least one entity type and/or at least one field. Furthermore, the tokens may be capable of being serialized.

Additionally, in one embodiment, the tokens may be utilized to separate a discovery phase from an information acquisition phase, the discovery phase and the acquisition phase being associated with the generating. For example, tokens may be utilized as opposed to describe objects to assists in multi-tenant efficiency by separating the discovery phase from a more expensive task of getting detailed describe information. In this case, the discovery phase may include discovering what objects and fields exist.

Still yet, as an option, data manipulation language (DML) updates associated with the on-demand database service may be based on the tokens. For example, DML updates may be based on the tokens such that an entire model is validated, more than typical dynamic SQL DML, which is usually string-based and therefore may be subject to runtime errors when SQL statements are concatenated incorrectly. This may result in a system being less susceptible to errors.

In another embodiment, the shape for the at least one custom object may be determined utilizing one or more describe structures. In this case, the describe structures may include getters (e.g. get functions, etc.) to extract describe information associated with the custom object. Other techniques may be employed in embodiments to determine shape. For example, computations may be performed on a stored known size and quantity of elements comprising a custom object to arrive at its shape. Still yet, shape could be determined in some embodiments based on memory allocated to various components of the custom object at run time. Other techniques may be envisioned by those skilled in the art to enable still further embodiments to determine shape of the custom objects given implementation specifics addressed.

It should be noted that, as an option, the receiving, determining, and generating may be performed for a plurality of organizations simultaneously. For example, in one embodiment, application servers associated with the on-demand database service may discover and operate efficiently on thousands of organizations at the same time (e.g. via Apex, etc.). Of course, in various other embodiments, the application servers operate on any number of organizations simultaneously or independently.

Figure 2:
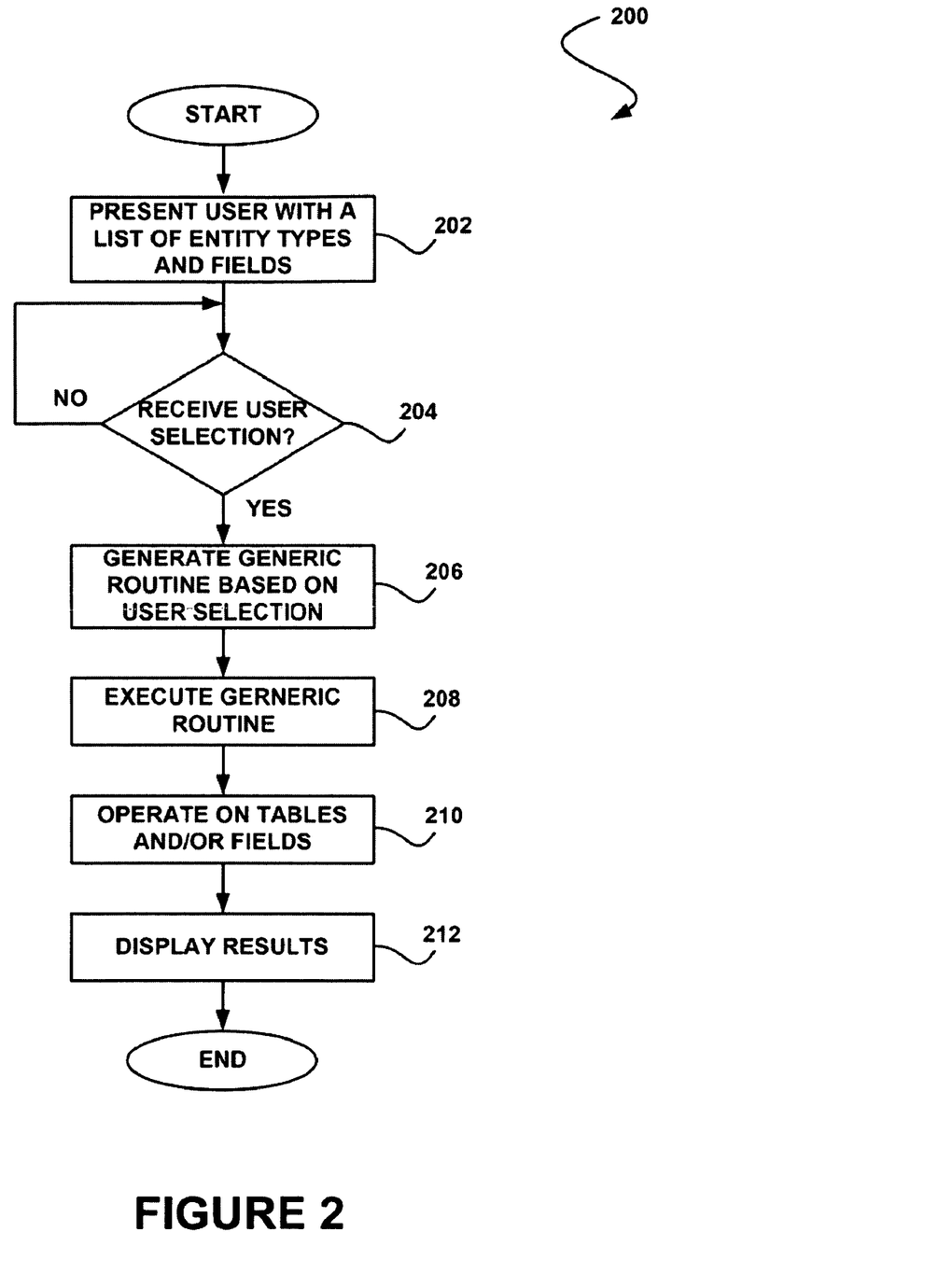
FIG. 2 shows a method for generating a set of instructions to an on-demand database service, in accordance with another embodiment.

FIG. 2 shows a method 200 for generating a set of instructions to an on-demand database service, in accordance with another embodiment. As an option, the present method 200 may be implemented in the context of the functionality of FIG. 1. Of course, however, the method 200 may be implemented in any desired environment. The aforementioned definitions may apply during the present description.

As shown, a user is presented with a list of entity types and fields. See operation 202. In one embodiment, the user may be presented with the list of entity types and fields on a user interface. As an option, the user may have access to the list of entity types and fields through an application programming interface.

It is then determined whether a user selection is received. See operation 204. If a user selection is received, a generic routine is generated based on the user selection. See operation 206.

The generic routine may then be executed. See operation 208. As part of the execution, the generic routine may operate on and/or modify tables and/or fields. See operation 210. The results of the operation may then optionally be displayed. See operation 212.

Using this technique, script-level access to information about schema may be allowed for a current organization associated with the on-demand database service, and a current user of the on-demand database service.

Separately by providing iteration access to a list of entity types (e.g. SObject types, etc.) and their fields, construction of dynamic statements (e.g. SOQL statements, DML statements, etc.) as strings may be allowed. In one embodiment, these dynamic statements (i.e. instructions) may be executed as dynamic queries, as well as dynamic entity (e.g. SObject, etc.) construction for DML.

In one embodiment, dynamic SQL may be utilized to construct the dynamic statements because it allows for generic routines to be written, where the routines do not know the objects (e.g. the tables or fields, etc.) on which they are going to operate until runtime.

For example, to write a general query output tool, a user may be presented with a list of entity types and fields (e.g. available from one or more describe objects, etc.). Once the user has chosen a query, that dynamic query may be executed and the results of the execution may be dynamically retrieved and displayed.

A lower-level exemplary use case may be a general utility that clones an object and all of its child rows. This utility may first need to interrogate the describe objects to find those that have a master/detail foreign key that point at an account. Dynamic queries may then be executed to get the data and dynamic DML may be utilized to write the cloned data.

Another exemplary use case may be the construction of SELECT queries. For example, for applications that require querying on an unknown list of fields (e.g. at design time, etc.), it may be possible to construct a dynamic SELECT statement using the list of fields for that entity type.

In one embodiment, all organizations associated with the on-demand database service may be able to use describe objects in Apex. In one embodiment, this information may be read only and may not cause any harm.

It should be noted that, in one embodiment, global describe and entity field maps may allow code to discover all of the schema in an entire system. Since Apex may run in system mode, and since the global describe and entity field maps described below may allow the code to discover all of the schema in the entire system, slow execution of this functionality may be allowed.

In one embodiment, normal code may only have access to entity types and fields that a current user is able to access. In general, this is more restrictive than normal Apex code which can be written against any schema element that the code author is able to access. Thus, testing applications that use a describe function may take advantage of a "run test as user" feature that may be implemented in one embodiment.

As an option, an application written internally to the on-demand database service may allow describe access to all schema. Furthermore, certain code may be utilized to determine whether a current user a capable of viewing an entity type and field. In one embodiment, a permission may be implemented that certifies a partner application may view more of the schema with their applications. As an option, dynamic Apex may be protected by a permission.

It should be noted that the schema may include entity types (e.g. SObject types, etc.) and fields. In one embodiment, each entity type and field may have at least two types of Apex data structures for manipulating them, opaque tokens and describe structures.

For example, in one embodiment, Apex structures may be utilized that mirror API describe objects. These may have the same names (e.g. Schema.DescribeSObjectResult, Schema.Field, etc.) as in web service destination language (WSDL). Furthermore, these structures may have many getters for all of the describe information (e.g. getLabel( ), etc.). It should be noted that property-like access to the getters may also be allowed, without using a method invocation syntax.

As an option, certain pieces of information may be presented in a more usable format than the API. For example, in the API, relationships among describe objects may be represented as strings, rather than other structures.

As noted above, in another embodiment, opaque tokens may be utilized to manipulate entity types and fields. In this case, the opaque tokens may represent each entity type and field. Furthermore, the opaque tokens may be able to be serialized [e.g. for a model view controller (MVC), etc.] and may be used to describe specific entity types and fields. For example, the tokens may indicate or query whether an item is a specific row and of a specific type (e.g. SObject row of type "Account," etc.).

In one embodiment, an Apex syntax may be utilized to represent opaque tokens and describe structures. In terms of Apex syntax, two different mechanisms may be utilized to handle these two different types of objects. In one embodiment, an Apex syntax may be provided for describe access that closely matches a syntax used in formula fields. Table 1 shows an example of various formula fields, in accordance with one embodiment.

TABLE 1

$ObjectType.Account ← A describe structure
$ObjectType.Account.label ← getLabel( ) for that structure
$ObjectType.Account.fields.Name ← access to a specific field describe
$ObjectType.Account.fields.Name.label ← getLabel( ) for that field structure Thus, in Apex, a class Schema.SObjectType may be introduced that has static elements for each SObject type of type DescribeSObjectResult such that Schema.DescribeSObjectResult d=Schema.SobjectType.Account. When representing a structure of a "fields" structure in Apex syntax, the fields structure may be intended to be accessed immediately with either a field member variable or a getMap( ) function, as shown in Table 2.

TABLE 2

Schema.Field f = Schema.SobjectType.Account.fields.Name;
Map<String, Schema.SObjectField> m =

TABLE 2-continued

Schema.SobjectType.Account.fields.getMap( );

As an option, the first expression shown in Table 2 may implement parsing to validate that the final token is valid for the entity type at compile time. In this case, the name of the entity object type (e.g. "Account" in this example, etc.) may be found by searching backwards in the parser expression. It may then be validated that the field name is legitimate.

The second expression may yield a map that can be used to access a field by name. It should be noted that, in one embodiment, the value type of this map may not be the field describe structure type. For example, these may be expensive to create and it may be desirable not to create them all at once. Instead, as an option, field tokens, which are light-weight, may be utilized in the map.

In one embodiment, "SobjectField" and "SobjectType" may represent opaque identifier types that can be compared with a "==" operator to determine whether a field or entity type is actually a specific schema element. For example, Table 3 shows an implementation of this, in accordance with one embodiment.

TABLE 3

Sobject s = new Account( );
System.assert(s.getSobjectType( ) == Account.sobjectType);
DescribeSobjectResult r= Account.sobjectType.getDescribe( );
Field f = Schema.SobjectType.Account.fields.name;
System.assert(f.getSobjectField( ) == Account.name);
f = f.getSobjectField( ).getDescribe( );

In various embodiments, a user may choose between utilizing the tokens and/or describe objects and may optionally switch between the use of each. It should be noted that, one reason for implementing these convenience mechanisms for accessing entity object tokens and entity field tokens is that the alternatives may be very long.

For example, Table 4 shows one option for accessing entity object and entity field tokens, in accordance with one embodiment.

TABLE 4

Schema.SObjectType t =
Schema.SObjectType.Account.getSObjectType( );
Schema.SObjectField f =
Schema.SObjectType.Account.fields.Name.getSObjectField( );

Table 5 shows one option for accessing entity object and entity field tokens utilizing a convenience mechanism, in accordance with one embodiment.

TABLE 5

Schema.SobjectType t = Account.sobjectType;
Schema.SobjectField = Account.Name;

Thus, at least two describe types and two token types may be utilized for entity types and fields (e.g. SObject types and fields, etc.). Furthermore, one syntax may be used to optionally access describe functionality easily (e.g. Apex syntax matches formula syntax, etc.), in addition to a convenience syntax for the tokens. Still yet, a user may switch back and forth between the use of tokes and describe structures.

It should be noted that, as an option, property access may be provided for all WSDL techniques. In this case, the getter and setter techniques may be accessed as if they were member variable read and write. Thus, if a WSDL object "o" has an associated script getXXX( ) and setXXX( ), then "o.xxxx" may be read and written in Apex.

In one embodiment, entity types (e.g. Account and MyCustomObject_c, etc.) may function as static classes with special static methods and member variables for accessing tokens. This may provide a level of type safety in the use of this token syntax since the script writer may explicitly reference the object type name and field names at compile time. Additionally, these references may be recorded in the metadata for the code unit as are other schema references.

In order to identify a specific entity type (i.e. in order to ask the question "is this generic SObject actually an Account?"), the opaque tokens may be utilized. For example, "Schema.SObjectType" may be the data type of the entity type token and "Schema.SobjectField" may be the data type of the field token.

In one embodiment, each entity type (e.g. SObject type, etc.) may have a static member called "sobjectType" that represents this atomic token. Thus, "Account.sobjectType" and "MyCustomObject_c" sobjectType may be the unique tokens that identify those entity types. Furthermore, these unique tokens may be utilized to determine whether an SObject or list of SObjects is of a particular SObject type. In various embodiments, this may be implemented using the techniques shown in Table 6, using a getSObjectType( ) function, in accordance with one embodiment.

TABLE 6

SObject s = Database.query('select id from account');
System.assertEquals(s.getSObjectType( ), Account.sobjectType);
List<Sobject> l = new Account[ ];
System.assertEquals(l.getSObjectType( ), Account.sobjectType);

Furthermore, a formula syntax may yield the describe structure for an SObject type Schema.DescribeSobjectResult d=Schema.SobjectType.Account. It should be noted that, for convenience and for consistency with SObjectField, an SObjectType object may have a getDescribe( ) function to return the describe information. This may be particularly useful when using global describe to iterate all entity type (e.g. SObjectType, etc.) tokens.

Table 7 shows optional properties for Schema.DescribeSobjectResult, based on a WSDL object, in accordance with one embodiment.

TABLE 7

| Name |
| --- |
| Accessible |
| Activateable |
| Activateable |
| childRelationships |
| Createable |
| Custom |
| Deletable |
| Fields |
| keyPrefix |
| LocalName |
| Label |
| labelPlural |
| Layoutable |
| Listviewable |
| lookupLayoutable |
| Mergeable |
| name |
| queryable |
| recordTypeInfos |

TABLE 7-continued

| Name |
|---|
| replicateable |
| retrieveable |
| searchLayoutable |
| searchable |
| triggerable |
| undeletable |
| updateable |
| url* |

Table 8 shows optional properties for Schema.ChildRelationship, in accordance with one embodiment.

TABLE 8

| Name |
|---|
| childSObject |
| cascadeDelete |
| relationshipName |
| Field |

For the accessors that describe what the current user may perform (e.g. "creatable," etc.), the value may depend on what the user may normally perform outside of a system. As an option, each field of an SObject type may be available as a member variable of type Schema.SObjectField (i.e. an atomic field token type) Schema.SObjectField=Account.AccountNumber.

To retrieve the describe information for a field, the getDescribe( ) function may be called on the SObjectField token using Schema.Field f=Account.accountNumber.getDescribe( ), or the formula syntax described above may be utilized.

Table 9 shows optional properties for Schema.Field, based on WSDL properties, in accordance with one embodiment.

TABLE 9

| Name |
|---|
| Accessible |
| autoNumber |
| byteLength |
| calculated |
| calculatedFormula |
| caseSensitive |
| controller |
| createable |
| custom |
| defaultValue |
| defaultValueFormula |
| defaultedOnCreate |
| dependentPicklist |
| digits |
| externalId |
| filterable |
| htmlFormatted |
| idLookup |
| label |
| length |
| localName |
| name |
| nameField |
| namePointing |
| nillable |
| picklistValues |
| precision |
| referenceTo |
| relationshipName |
| restrictedPicklist |
| Scale |

TABLE 9-continued

| Name |
|---|
| soapType |
| sortable |
| type |
| unique |
| updateable |

Again, the accessors such as "creatable" may return what a current user may perform, when not in system mode. For example, to retrieve the label for a field, a user may set String 1=Account.accountNumber.getDescribe( ).getLabel( ).

In one embodiment, internal to the on-demand database service, the fetching of picklist values may be done lazily by an Apex code engine, because the database associated with the on-demand database service may need to be accessed to retrieve this information. Furthermore, the information may not necessarily be cached in an application server associated with the on-demand database service. For this reason, interrogating many picklist fields may be expensive. Other lazily populated Apex data structures may include record type information and child relationships, although this information may still be available from cache.

In one embodiment, a governor limit related to picklists may be implemented. As an option, the governor limit may implemented in the context of describes in general. In another embodiment, a maximum number of fields that can be interrogated may be utilized (e.g. 10, 20, 30, etc.). Furthermore, in one embodiment, a bulk picklist "pre-fetch" call may be added to Apex for an entire entity. In this case, all of the fields in that entity may count as one call for this governor limit.

As an option, each entity type may allow accessing all of its fields by name via the getMap( ) function of the fields structure which represents a map from string to SObjectField. For example, Schema.SObjectField f=Account.fields.getMap( ).get('accountNumber'). It should be noted that, in one embodiment, this map may use case insensitive string comparison so that the field name does not have to be in exactly the right case format. Furthermore, this may be available later to other maps such that script writers may have case insensitive maps.

As an option, the map may be used to iterate all fields for an entity type. In this way, a user may construct a SELECT query. In some cases, namespaces may not be straight forward to implement. For example, it may be desirable to have code in one namespace to be able to lookup fields and entity types in the same implicit manner as hard-coded references (e.g. without a prefix, etc.). Therefore, as an option, the map may be dynamic.

Depending on the namespace of the enclosing block, the keys in the map may be the short-hand form of the field names. Thus, if code is in namespace N1, and a field is also in N1, then the key in this map will be simple, MyField_c. However, for a field in N2 the key will be N2_MyField_c. In this case, standard fields may not have a prefix. In one embodiment, another map may be added that is based on a fully qualified name for all fields.

As mentioned above, in order to determine a type of an entity (e.g. an SObject, etc.) and collections of entities (e.g. collections of SObjects, etc.) at runtime, a getSObjectType( ) function may be provided for various types such as SObject, List<SObject>, and Map<anyKeyType, SObject>.

In one embodiment, a global describe may be utilized to access all entity types. In this case, the function Map<String, Schema.SObjectType> Schema.getGlobalDescribe( ) may return a map from SObject type name to SObjectType. In this case, tokens may be put into the map because these may be light-weight (e.g. for efficiency, etc.) as compared with the describe objects. As an option, this map may be case insensitive in the same way as the getMap( ) function.

In furtherance of obtaining structured metadata, the getDmlFields( ) function may return an array of System.SObjectField instead of an array of Strings. In this case, a new function getDmlFieldNames( ) may then be constructed to behave like the old function. In one embodiment, for backwards compatibility, getDmlFields( ) may behave as originally released where a list of strings is returned.

In some cases, script authors may wish to determine whether the current organization or user has specific permissions/features turned on, at runtime. These features may be in the form of permissions, or preferences, etc. Thus, as an option, at least some of this information may be made publicly available by annotating udd bits with an "isApexExposed" setting.

Additionally, in one embodiment, campaigns permission may be available. In another embodiment, these may all turn into "UserInfo" static techniques. For example, a user may set Boolean b=UserInfo.orgHasPermissionCampaigns( ). As an option, the campaign permission may be hidden. Furthermore, in various embodiments, other organization permissions, preferences, and user permissions may be exposed.

The ability to execute SOQL dynamically as a string at runtime may allow much more flexible applications. Furthermore, the ability to interrogate metadata with the describe objects and then use this information in constructing a SOQL string allows for very powerful functionality.

In one embodiment, the main dynamic SOQL function may be List<SObject> Database.query(<String>). This may return a List<SObject> expression at compile time. This function invocation may be used wherever an inline static query is used (e.g. [select id from account], etc.) in regular assignment statements as well as for loop idiom. The latter looping idiom may cursor through the results in the same way as static queries do today.

As a convenience, the loop variable in a select loop may be a concrete entity type. At runtime, it may be validated that the type of the query matches the declared type of the variable. This may prevent the need to cast constantly from generic SObject to a concrete SObject type.

This same conversion may be implemented for assignment and function arguments. That is, normal assignment to a concrete entity type, or function argument matching, may also allow the use of single entity or a list of entities without casting. This may be implemented as parser logic similar to the way automatic casting of query results may be allowed to a single concrete SObject value. As an option, a runtime error may result if the query does not return the correct type, in addition to checking for a row count of one, for single row conversion.

As another option, the function "Integer Database.countQuery(<String>)" may be used with a dynamic SOQL query that uses the count( ) syntax. Table 10 shows an example implementation of a dynamic SOQL query, in accordance with one embodiment.

TABLE 10

Account a = Database.query('select name from Account limit 1');
Contact[ ] c = Database.query('select lastName from contact');

In some cases, dynamic SOQL may not allow the user of certain features available from concrete inline queries such as count( ), FOR UPDATE, and binding, etc. In another embodiment, dynamic SOQL may allow certain features, such as count( ) queries, and other features.

In addition to being able to perform a query dynamically, it may be desirable to allow users to dynamically modify data. In this case, the generic entity type may be utilized. In one embodiment, the type of an entity or the type of a list or map of entities may be introspected using the getSobjectType( ) function described above, which may return the same SobjectType token as a static class token. Table 11 shows an example this, in accordance with one embodiment.

TABLE 11

SObject s = Database.query('select name from account limit 1');
System.assertEquals(Account.class, s.getSObjectType( ));

It should be noted that equals( ) for SobjectType and SObjectField may work when the two sides represent the same SObject type or field. This may allow strongly typed referencing of schema names.

Incidentally, if a describe object is received for the same SObject type or field, the same object may be handed out for a single request. Thus, equals( ) works on DescribeSObjectResult and Field. The same getSobjectType( ) above may work for a list or map of SObjects. Table 12 shows an example of this implementation, in accordance with one embodiment.

TABLE 12

Account[ ] aa = new Account[0];
Schema.SobjectType t = aa.getSobjectType( );
Map<String, Account> m = new Map<String, Account>( );
t = m.getSobjectType( );

Conversely, it may be desirable to be able to initialize a new entity of a given type. This technique may act as a factory for a generic type of entity (e.g. SObject, etc.). In one embodiment, implementing a newSObject( ) technique on SObjectType may serve this purpose as in "Account a=(Account) Account.class.newSObject( )."

In addition, partner-API-like functionality may be implemented for setting and getting values by a string name or token (e.g. an SObjectField token, etc.). As an option, these functions may be hidden behind a dynamic Apex organization permission. In one embodiment, there may be four get and four put functions for an entity (e.g. SObject, etc.) instance. Table 13, shows four get and four put functions, in accordance with one embodiment.

TABLE 13

Object get(String)
Object get(Schema.FieldType)
SObject getSObject(String)
SObject getSobject(Schema.FieldType)
Object put(String, Object)
Object (Schema.FieldType, Object)
SObject putSObject(String, SObject)
SObject putSObject(Schema.FieldType SObject)

For each of these functions, either the name of a field or its token (e.g. an SObjectField token, etc.) may be accepted. It should be noted that for foreign keys, a scalar ID value may be read or written using get( ) or put( ). In order to read or write the foreign key object, however, the getSObject and putSObject functions may be utilized.

It should be noted that, that the field token generated for foreign keys may be either a standard field name ending with an ID (e.g. Contact.AccountId, etc.), or the "_c" form of a custom foreign key. As an option, this token may be used for the putSObject function. As another option, relationship name tokens, such as "_r" tokens, may be generated. In this case, the getSObject( ) function may be renamed to get( ) because the argument type would be a new type of relationship token. Table 14 shows an example implementation of this, in accordance with one embodiment.

TABLE 14

```
SObject s = [select accountNumber from account limit 1];
Object o = s.get('AccountNumber');
s.put('AccountNumber', 'abc');
User u = (User)s.getSobject(Account.OwnerId);
```

It should be noted that the introduction of the new "Object" scalar type above may serve as a base type for all data scalar types (e.g. String, Integer, Date, etc.). As an option, "Object" may support casting and instance of with these scalar types. Thus, given an "Object" expression, it may be determined whether the expression contains a String, ID, or Datetime, etc.

It should be noted that, in general, Apex calls for explicit conversion of data types. For instance, strings and numbers may not be implicitly converted. One of the conversion system functions should be called. These may cause runtime exceptions if the value is not convertible, such as when a string is not a valid number.

In addition to the descriptions above, in other embodiments, various other functionality may be implemented. For example, in one embodiment, numbers may form a hierarchy of types. For example, the hierarchy may be integer, long, double, and decimal.

Furthermore, in one embodiment, values of lower types may always be assigned to higher types without conversion. In this case, an Integer may be assigned to a Long, or passed as a Long value. However, once passed, the value may be converted to the higher type.

Still yet, as mentioned above, instance of may work with scalar types. Table 15 shows an implementation of this, in accordance with one embodiment.

TABLE 15

```
Integer i = 1;
// Converts the value to Long - no longer an Integer
Long lg = i;
System.assert(!(lg instanceof Integer));
```

System Overview

Figure 3:
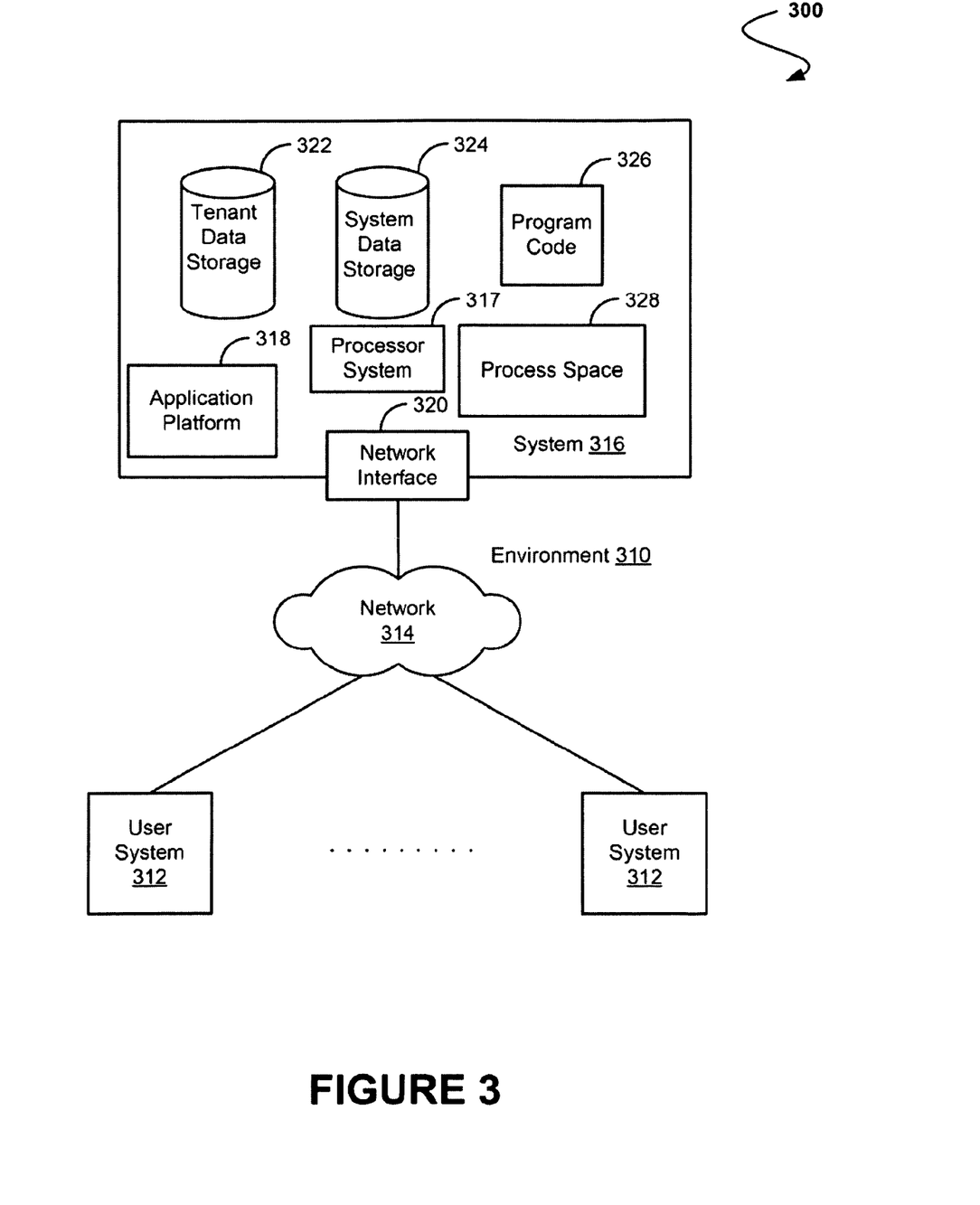
FIG. 3 illustrates a block diagram of an example of an environment wherein an on-demand database service might be used.

FIG. 3 illustrates a block diagram of an environment 310 wherein an on-demand database service might be used. As an option, any of the previously described embodiments of the foregoing figures may or may not be implemented in the context of the environment 310. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

Figure 4:
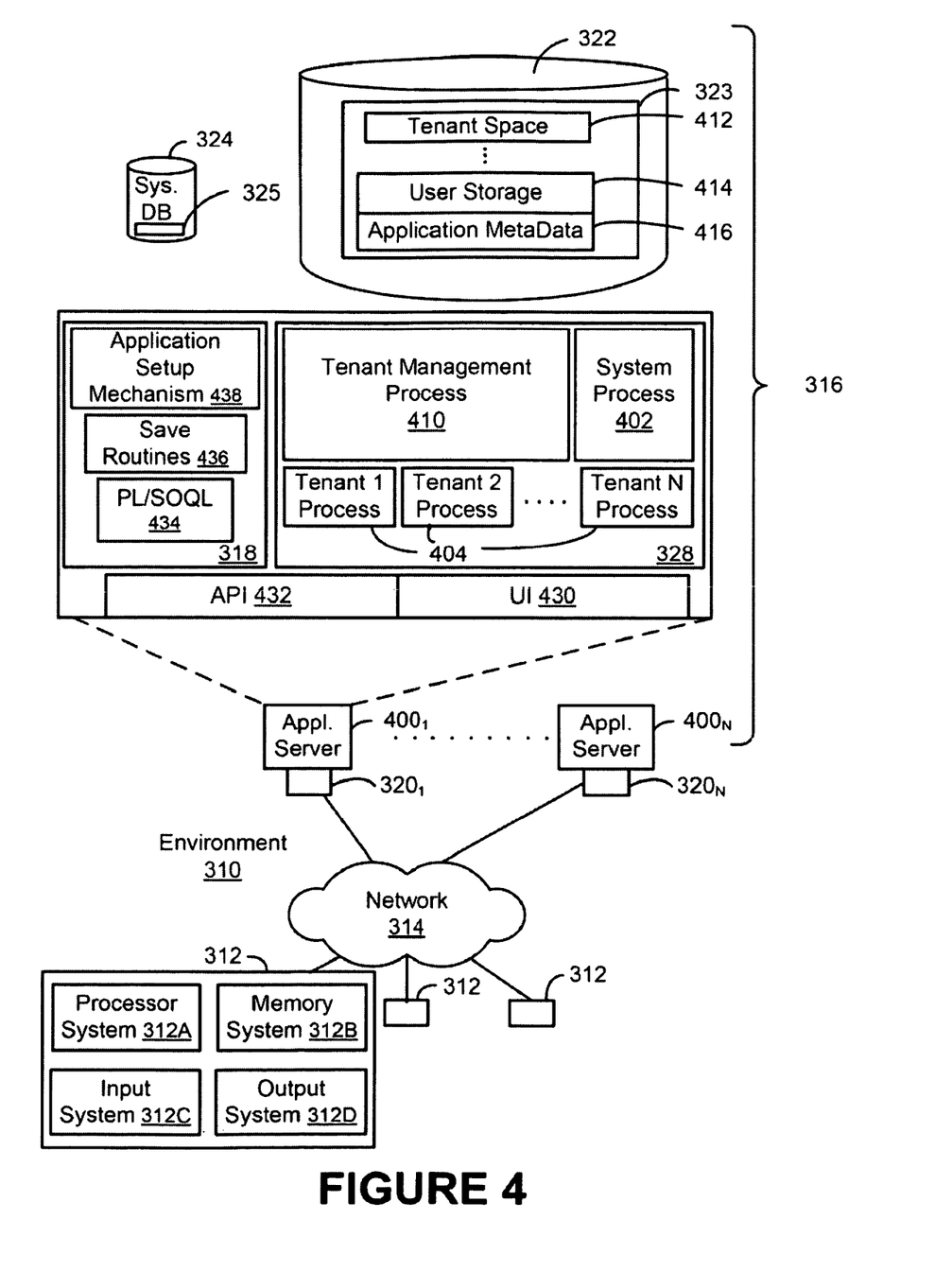
FIG. 4 illustrates a block diagram of an embodiment of elements of FIG. 3 and various possible interconnections between these elements.

One arrangement for elements of system 316 is shown in FIG. 4, including a network interface 320, application platform 318, tenant data storage 322 for tenant data 323, system data storage 324 for system data accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application (s) including computer code to run using a central processing unit such as processor system 317 of FIG. 3, which may include an Intel Pentium® processor or the like, and/or multiple processor units. A computer program product embodiment includes a machine-readable storage medium (media) having instructions stored thereon/iii which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein.

Similarly, the database object described herein can be implemented as single databases, a distributed database, a collection of distributed databases, a database with redundant online or offline backups or other redundancies, etc., and might include a distributed database or storage network and associated processing intelligence.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WED SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   receiving at a platform supporting applications built by third parties, at least one programming language instruction associated with at least one custom object, the at least one custom object including a table of a database;
   determining a shape for the at least one custom object based upon a runtime instance of the at least one custom object, the shape indicated by a number of rows and columns of the table; and
   generating, based on the at least one programming language instruction, a set of instructions to an on-demand database service, the set of instructions configured to operate upon the runtime instance of the at least one custom object based upon the shape;
   wherein the shape is determined utilizing one or more tokens;
   wherein each of the tokens indicates a row of the table and a type of the row of the table, and the one or more tokens are utilized for indicating the shape associated with the at least one custom object.

2. The method of claim 1, further comprising applying the set of instructions to the on-demand database service.

3. The method of claim 2, wherein applying the set of instructions to the on-demand database service affects a result in accordance with the at least one programming language instruction.

4. The method of claim 1, further comprising presenting a user of the on-demand database service with a list of entity types.

5. The method of claim 4, wherein the list further includes a plurality of fields.

6. The method of claim 5, further comprising receiving a selection of one or more of the plurality of fields or the entity types.

7. The method of claim 6, further comprising generating the set of instructions based on the selection.

8. The method of claim 7, wherein the set of instructions includes a query.

9. The method of claim 7, further comprising executing the set of instructions.

10. The method of claim 9, further comprising displaying results of the execution of the set of instructions.

11. The method of claim 1, wherein the at least one custom objects are capable of accessing the one or more tokens.

12. The method of claim 1, wherein the one or more tokens are utilized to separate a discovery phase from an information acquisition phase, the discovery phase and the acquisition phase being associated with the generating.

13. The method of claim 1, wherein data manipulation language (DML) updates associated with the on-demand database service are based on the one or more tokens.

14. The method of claim 1, wherein the receiving, determining, and generating are performed for a plurality of organizations simultaneously.

15. The method of claim 1, wherein the on-demand database service includes a multi-tenant on-demand database service.

16. A non-transitory machine-readable medium storing one or more sequences of instructions which, when executed by one or more processors, cause the one or more processors to carry out the steps of:
   receiving at a platform supporting applications built by third parties, at least one programming language instruction associated with at least one custom object, the at least one custom object including a table of a database;
   determining a shape for the at least one custom object based upon a runtime instance of the at least one custom object, the shape indicated by a number of rows and columns of the table; and
   generating, based on the at least one programming language instruction, a set of instructions to an on-demand database service, the set of instructions configured to operate upon the runtime instance of the at least one custom object based upon the shape;
   wherein the shape is determined utilizing one or more tokens;
   wherein each of the tokens indicates a row of the table and a type of the row of the table, and the one or more tokens are utilized for indicating the shape associated with the at least one custom object.

17. An apparatus, comprising:
   a processor; and
      one or more stored sequences of instructions which, when executed by the processor, cause the processor to carry out the steps of:
         receiving at a platform supporting applications built by third parties, at least one programming language instruction associated with at least one custom object, the at least one custom object including a table of a database;
      determining a shape for the at least one custom object based upon a runtime instance of the at least one custom object, the shape indicated by a number of rows and columns of the table; and
      generating, based on the at least one programming language instruction, a set of instructions to an on-demand database service, the set of instructions configured to operate upon the runtime instance of the at least one custom object based upon the shape;
      wherein the shape is determined utilizing one or more tokens;
      wherein each of the tokens indicates a row of the table and a type of the row of the table, and the one or more tokens are utilized for indicating the shape associated with the at least one custom object.

18. A method for transmitting code for use in a multi-tenant database system on a transmission medium, the method comprising:
   transmitting code for receiving at a platform supporting applications built by third parties, at least one programming language instruction associated with at least one custom object, the at least one custom object including a table of a database;
   transmitting code for determining a shape for the at least one custom object based upon a runtime instance of the at least one custom object, the shape indicated by a number of rows and columns of the table; and
   transmitting code for generating, based on the at least one programming language instruction, a set of instructions to an on-demand database service, the set of instructions configured to operate upon the runtime instance of the at least one custom object based upon the shape, utilizing a processor;
   wherein the shape is determined utilizing one or more tokens;
   wherein each of the tokens indicates a row of the table and a type of the row of the table, and the one or more tokens are utilized for indicating the shape associated with the at least one custom object.

* * * * *